United States Patent Office 3,330,674
Patented July 11, 1967

3,330,674
MOLDING COMPOSITION CONTAINING IRON OXIDE AND STARCH
Philip H. Santmyer, Plainview, Tex., assignor to Harvest Queen Mill & Elevator Company, Dallas, Tex., a corporation of Texas
No Drawing. Filed Dec. 21, 1964, Ser. No. 420,133
8 Claims. (Cl. 106—38.5)

This application is a continuation-in-part of application Ser. No. 347,019, filed Feb. 24, 1964.

This invention relates to a foundry binder and to its use in a method of molding metallic articles. More specifically, it relates to a foundry binder which is mixed with molding sand to produce a mold having superior characteristics for molding articles. Such mold is used in a process for molding metallic articles having surfaces substantially free of fuse or sintered particles of sand bonded to the surface of the molded article and substantially free of ceroxide defects in the molded article.

In the art of molding, various binders have been used to bond the molding sand and give it certain desired characteristics. One characteristic of importance is strength. If a green mold is to be used, green strength is important. If a dry mold is to be used, sufficient green strength is required for the mold to hold its shape during the drying process and thereafter the mold must have good dry mold strength characteristics. In addition to strength, various other characteristics are desirable in the molding sand composition. It should be capable of being rammed, or otherwise formed into the desired mold shape. It should be susceptible to simple recovery after molding to permit its repeated use. Moreover, it is important that the molding sand composition be of such character that it may be used in a mold to form objects having high integrity of shape and good surface characteristics.

In forming metal articles by use of molds made of molding compositions of the prior art, a problem which has caused considerable difficulty is burn-on. The term "burn-on" is generally used in the art to describe the adherence of sand, clinging in a tenacious manner, to the surface of the molded article. This tightly bonded sand is quite difficult to remove, normally requiring substantial grinding, sand blasting, or other special removal technique. In some cases, burn-on can be so extreme that the article is ruined for all practical purposes.

Another problem which has caused considerable difficulty in the art of casting is a tendency of slag and the article being casted to react, with slag displacing metal in the casting. This type of defect, often referred to as a "ceroxide defect," is often noted in the case of articles casted of steel.

It is an object of this invention to provide a foundry binder which can be mixed with molding sand and water to produce a sand-binder casting composition that has structural green strength and dry strength of sufficient levels for practical use; that has the other usual characteristics required of a molding composition for it to be usable in efficient molding of metallic articles having high integrity of shape; and, at the same time, that makes it possible to overcome the problems of burn-on and ceroxide defects to provide relatively sand-free surfaces of high quality.

It is a further object to provide a method to produce casted articles having high integrity of shape, including good surface characteristics, without substantial occurrence of burn-on or ceroxide defects.

Moreover, it is an object to provide a foundry binder and molding composition, meeting the foregoing objects, which is serviceable as a facing sand for a mold which makes it possible to produce high quality casted products, free of burn-on and ceroxide defects.

In accordance with this invention, a foundry binder is provided which comprises a mixture of small particles of iron oxide and a compound selected from the group consisting of starch and ligno sulfonates.

In a specific preferred embodiment, the foregoing foundry binder comprises roughly equal proportions, based on weight, of iron oxide and of a compound selected from the group consisting of starch and alkali metal ligno sulfonates, alkaline earth metal ligno sulfonates, and ammonium ligno sulfonate. Moreover, in an alternate quite specific preferred embodiment, a halide compound selected from the group consisting of ammonium halides, alkali metal halides, and alkaline earth metal halides, preferably ammonium chloride or sodium chloride, is present in the binder in a proportion roughly equal to that of each of the other components, i.e., the components are roughly in 1:1:1 ratio by weight.

This invention also provides a molding composition comprising a major proportion of sand, a minor proportion of water (but no less than about 1%, based on the weight of the composition) and a minor proportion of a foundry binder. The foundry binder comprises a mixture of small particles of iron oxide and a compound selected from the group consisting of starch and alkali metal ligno sulfonates, alkaline earth metal ligno sulfonates, and ammonium ligno sulfonate.

In another aspect, this invention provides a method of making a molding composition consisting of sand, iron oxide, and a compound selected from the group consisting of starch and ligno sulfonates, which method consists of thoroughly premixing the iron oxide and starch or a ligno sulfonate, and thereafter adding the premixed material to sand and water in a suitable mixing device, e.g., a muller.

In a quite specific preferred embodiment of a molding composition of the present invention, sand is present in quantity of at least about 90% by weight; the foundry binder (i.e., iron oxide with either starch or a ligno sulfonate) is present in quantity of between about 2–3% by weight and 9% by weight. A preferred minimum of no less than about 1% water is used in the composition. In a specific preferred embodiment, the molding composition contains a minor proportion of a compound selected from the group consisting of ammonium halides, alkali metal halides and alkaline earth metal halides, preferably ammonium chloride or sodium chloride.

The invention also provides for utilizing the foregoing-mentioned molding composition to form a mold, it being understood that the word "mold" is used in the broad sense to include cores, as well as molds in the narrower sense of the word.

This invention further provides a method of producing a molded article which comprises the following steps: forming a binder by blending small particles of iron oxide with starch or with a lingo sulfonate; thereafter forming a molding composition by mixing a minor proportion of the binder with a major proportion of sand and a minor proportion of water, but not less than about 1%, based on the weight of the composition; forming the molding composition into a mold of desired shape (it is to be understood that forming a facing within a mold of desired shape is intended to be included within the phrase "forming a mold of desired shape"); drying the mold; introducing molten metal into forming position with respect to the mold and permitting the molten metal to cool to form a casted article which conforms to the shape of the mold; and removing the resulting casted article from contact with the mold. During molding, constituents of the binder material act to prevent burn-on and ceroxide defects on the resulting molded article.

Turning now to a more detailed description of this invention, a typical composition of the binder includes about one-half iron oxide and about one-half of either starch and/or a lingo sulfonate, by weight. The ingredients preferably have a particle size no greater than about 100–200 mesh (or smaller), Tyler screen size, for best results. Moreover, they are thoroughly blended together.

The binder is mixed with a molding sand, preferably a high quality silica sand of the type that is not naturally bonding. A relatively small quantity of water is added. The sand, binder, and water are thoroughly mixed together, preferably in an efficient sand muller, to form a molding composition. Note that iron oxide and starch or ligno sulfonate are preferably premixed by thoroughly blending them prior to the combining of the binder with sand and water. The significance of first mixing the binder will be pointed out later herein.

Thereafter, the molding composition is formed in the desired shape to make a green mold. This forming step is accomplished in conventional ways, usually by a ram.

The resulting green mold may be used for the casting of a metallic article, according to the usual green sand technique, but is preferably dried as in an oven to form a baked mold.

The resulting mold is thereafter used to mold metal to the desired shape, in a molding step, which is conducted in accordance with customary foundary practice to form an article of high shape integrity having a surface relatively free of burn-on and ceroxide defects. While it is not known with certainty how the ingredients of the molding composition cooperate in the course of molding to eliminate adherence of sand particles to the casted article and to minimize or eliminate ceroxide defects, it is believed that the iron oxide, in the particular reducing environment provided by the intimately mixed ligno sulfonate or starch, competes with the iron in the casting being molded for reaction with silicon dioxide, the silicon dioxide preferentially reacting with the iron oxide. Essentially the same mechanism is believed to explain the elimination of ceroxide defects. Thus, the iron oxide, in the reducing environment provided by the starch or ligno sulfonate, is believed to react with slag to stop ceroxide defect.

For the mold to retain satisfactory strength and to function properly to form articles in accordance with good foundry practice, the amount of binder should not exceed about 9%. If the amount of binder falls below about 2–3% its strength is insufficient for most purposes.

A critical minimum of 1–2% (probably close to 1.5%) of iron oxide should be present in the molding composition and at least about 1% of starch and/or ligno sulfonate should be present. The minimum of about 1½ iron oxide is applicable in those instances where the binder is premixed. If the binder is not first formed in a premix step, but instead sand, iron oxide, starch and/or ligno sulfonate, and water are introduced into a muller for mixing, surprisingly it is found that about twice as much iron oxide is needed, i.e., on the order of about 3%. It is believed this probably is caused by adherence of the iron oxide to the starch particles, thus placing iron oxide and starch or ligno sulfonate in contiguous relation for coaction during the molding process.

When less than about 1½% iron oxide is present in the molding composition, or about 3% if the iron oxide and starch or ligno sulfonate are not premixed, it is found that the effectiveness of the molding composition in reduction of burn-on and ceroxide defects is quite substantially lowered.

If the content of water, based on the total binder-sand molding composition, falls below about 1%, the strength of the mold is insufficient. If the amount of water exceeds about 4–5%, deleterious effects will often be observed in casting practice on the molded article.

It has been found that the use of a small proportion of a compound selected from the group consisting of ammonium halides, alkali metal halides and alkaline earth metal halides to the binder or binder-sand molding composition makes it possible to more effectively use comparatively small amounts of water. Thus, for facilitation of the use of a small amount of water, on the order of a minimum of about 1%, the metal halide should be present. Without the metal halide, the preferred minimum quantity of water is about twice as much, ranging about 2–3%.

The following examples are given by way of illustration of the practice of this invention and are not to be taken as in any way limiting its scope.

*Example 1*

A binder is prepared by thoroughly blending together minus 100 mesh solid particles of starch and iron oxide, in equal proportions, on a weight basis. Four parts by weight of the binder are thoroughly mixed with two parts by weight water and 94 parts by weight of a pure silica sand of minus 70 mesh. A standard test sample core mold (a cylinder of two inches diameter and two inches height) is shaped of the resulting molding composition. The mold has a green compression strength of about 0.85 lb. per square inch and a green tensile strength of 7 jolts, as measured by a standard jolt impact testing machine following standard testing procedure, as described in Molding Methods and Materials, American Foundrymen's Society, First edition, 1962 (pages 290–295). It is placed in an oven and baked at 300° F. for 30 minutes. The resulting dry mold has a compression strength in excess of about 50 lbs. per square inch and a tensile strength of about 30.5 lbs. per square inch.

*Example 2*

The procedure of Example 1 is repeated, except that the proportions are varied in a series of runs in accordance with Table A hereafter. Table A indicates green and baked tensile strength for each run.

TABLE A

| Run No. | Sand, Percent by wt. | Binder,[1] Percent by wt. | Water, Percent by wt. | Green Compression Strength, p.s.i. | Baked Compression Strength, p.s.i. |
|---|---|---|---|---|---|
| 1 | 98 | 1 | 1 | 0.28 | 30.0. |
| 2 | 97 | 2 | 1 | 0.35 | 32.4. |
| 3 | 96 | 3 | 1 | 0.47 | 34.1. |
| 4 | 97 | 1 | 2 | 0.79 | Above 50. |
| 5 | 96 | 2 | 2 | 0.82 | Do. |
| 6 | 95 | 3 | 2 | 0.79 | Do. |
| 7 | 96 | 1 | 3 | 0.72 | Do. |
| 8 | 95 | 2 | 3 | 0.96 | Do. |
| 9 | 94 | 3 | 3 | 1.12 | Do. |
| 10 | 95 | 1 | 4 | 0.61 | Do. |
| 11 | 94 | 2 | 4 | 0.88 | Do. |
| 12 | 93 | 3 | 4 | 1.15 | Do. |

[1] Equal proportions by weight of $Fe_2O_3$ and starch.

*Example 3*

A test dried (baked) mold is formed in accordance with the procedure and having the composition of Example 1. The mold is used as a core mold in a casting process wherein about molten steel is poured about it and allowed to cool. On removal of the core from the resulting casted article, the shape imparted by the mold to the casted article was found to have a high integrity and the surface was comparatively smooth, evidencing substantially no burn-on or ceroxide defects.

*Example 4*

The procedure of Example 3 is repeated, except a multiplicity of runs is conducted on different test samples, each in accordance with a run of Example 2 above. Articles casted with the cores formed from the compositions of Runs 6, 9, and 12 are of quite high integrity, having substantially no burn-on or ceroxide defects. The articles casted with the cores formed from the compositions of Runs 5, 8, and 11 were of quite good quality compared to normal expectations, but were not nearly of as high a quality as is obtained with the cores of Runs 6, 9, and 12.

The articles casted with cores formed from compositions in accordance with Runs 1, 2, 3, 4, 7, and 10 were easily eroded in view of the weakness of the cores. From the foregoing it is seen that about 1% water is marginal; moreover, 1% binder is seen to be too little. For quite high quality articles, substantially free of burn-on or ceroxide defects, it is seen that approximately a minimum of about 1½% iron oxide is necessary.

*Example 5*

Example 1 is repeated, except sodium chloride particles of minus 100 mesh are added to the binder in equal proportion to the quantity of iron oxide employed. Thus the approximate weight ratios of components in the molding composition are 2 parts iron oxide: 2 parts starch: 2 parts sodium chloride: 2 parts of water: 92 parts sand. The green compression strength of the mold is 0.77 p.s.i. and the green tensile strength is 7 jolts. The baked (i.e., dry) compression strength is over 50 p.s.i. and the baked tensile strength is also over 50 p.s.i.

*Example 6*

The procedure of Example 5 is repeated, except that proportions are varied in a series of runs in accordance with Table B herebelow. Table B indicates green and baked tensile strength for each run.

TABLE B

| Run No. | Binder,[1] Percent by wt. | Water, Percent by wt. | Green Compression Strength (p.s.i.) | Baked Compression Strength (p.s.i.) | Green Tensile Strength (jolts [2]) | Baked Tensile Strength (p.s.i.) |
|---|---|---|---|---|---|---|
| 1 | 1.5 | 0.5 | .22 | 0 | 0 | 0 |
| 2 | 1.5 | 1.0 | .31 | 8.9 | 2 | 4.9 |
| 3 | 1.5 | 2.0 | .49 | 50.0 | 3 | 25.3 |
| 4 | 3.0 | .5 | .12 | 0 | 0 | 0 |
| 5 | 3.0 | 1.0 | .45 | 33.2 | 2 | 16.5 |
| 6 | 3.0 | 2.0 | .76 | above 50.0 | 8 | above 50.0 |
| 7 | 6.0 | .5 | 0 | 0 | 0 | 0 |
| 8 | 6.0 | 1.0 | .41 | 25.0 | 0 | 0 |
| 9 | 6.0 | 2.0 | .78 | above 50.0 | 12 | above 50.0 |

[1] Equal proportions by weight of $Fe_2O_3$, NaCl and starch.
[2] As measured by the testing apparatus and method referred to in Example 1.

*Example 7*

A test mold is formed in accordance with the procedure of Example 1, but utilizing the casting composition of Example 5. The test mold is used as a core mold in a molding process wherein molten iron is poured about it and allowed to cool. On removal of the core from the resulting casted article, the shape imparted by the mold to the article was found to have a high integrity and the surface was comparatively smooth, evidencing substantially no burn-on. Repetition of the example, casting steel in place of iron, results in a ceroxide defect-free article having substantially no burn-on.

*Example 8*

The procedure of Example 7 is repeated, except runs are conducted on nine different test samples which have compositions corresponding to those of the runs of Example 6 above. The results are, in general, consistent with those obtained in Example 4 (where no sodium chloride is used). In the cases of Runs 1, 4, and 7, the molds did not have sufficient strength to function in the casting process.

*Example 9*

Examples 5 and 8 are repeated, using ammonium chloride in place of sodium chloride. Substantially the same results are obtained. In the cases of Runs 1, 4, and 7, the molds did not have sufficient strength to function in the casting process.

*Example 10*

Cores are prepared of cylindrical shape, 2 inches in diameter by 2 inches in height, using a molding composition consisting of various quantities of a premixed binder of 1:1 weight ratio of iron oxide to starch, and various quantities of water, with sand. Each core is formed to contain a steel plate one-quarter inch below the top surface of the core. The plates are horizontally oriented, each being effectively circumscribed within the cross section of the cylinder containing it. The cores, containing the plates, are fired in a muffle furnace at 1000° C. for about 15 minutes. Thereafter the steel plates are recovered from the cores and checked for burn-on. The percentage of burn-on, based on the total plate area, is determined. The results are as follows for the plates in the respective cores having the percentages (by weight) for each core:

| Percent Binder (by wt.) | Percent Water (by wt.) | Percent "Burn-on" |
|---|---|---|
| 1 | 1 | 55 |
| 1 | 2 | 42 |
| 1 | 3 | 42 |
| 1 | 4 | 35 |
| 2 | 1 | 38 |
| 2 | 2 | 22 |
| 2 | 3 | 8 |
| 2 | 4 | 16 |
| 3 | 1 | 2 |
| 3 | 2 | 0 |
| 3 | 3 | 0 |
| 3 | 4 | 0 |

From the foregoing it is seen that little or no burn-on resulted when 1½% iron oxide is used (3% of the 1:1 iron oxide starch mix).

*Example 11*

The foregoing examples are repeated, using sodium ligno sulfonate in place of starch. The results were substantially the same.

*Example 12*

Example 11 is repeated, using calcium ligno sulfonate in place of sodium ligno sulfonate. The results are substantially the same.

*Example 13*

Example 1 is repeated, except the binder is not premixed. Instead, the iron oxide, starch, water and sand are introduced separately into the muller. Cores formed with the resulting molding composition are used for casting steel articles. It is found that burn-on is substantially more prevalent on these cores than on cores prepared with the binder premixed, i.e., blended prior to its addition to sand and water. Experimentation shows that approximately twice as much iron oxide is required if the binder is not prepared by blending prior to forming the molding composition.

*Example 14*

Comparison is made of molding compositions containing a metal halide and those without such metal halide. Binder is premixed of 50% by weight iron oxide and 50% by weight starch to add in varied proportions to water and sand to form one series of test core molds of the type referred to in Example 1 herein. A parallel series of test core molds of the same type is formed using a premixed binder that is 1:1:1 (by weight) iron oxide, starch, and sodium chloride. The same sand, Guion sand, a high silica sand from Guion, Ark., was used in making the molding compositions for each of the series. Green and baked (300° F. for 30 minutes) compression tests are run on both series. The data is presented in Table C.

Having described the invention in connection with certain specific embodiments thereof, it is to be understood that further modifications may now suggest themselves to those skilled in the art and it is intended to cover such modifications as fall within the scope of the appended claims.

TABLE C

| Run No. | Percent Binder A [1] (no halide) | Percent Binder B [2] (with halide) | Percent H$_2$O | Percent Sand | Green Compression Strength | | Baked Compression Strength | |
|---|---|---|---|---|---|---|---|---|
| | | | | | Cores A | Cores B | Cores A | Cores B |
| 1 | 1 | 1 | 1 | 98 | 0 | 0.35 | 0 | 0.4 |
| 2 | 2 | 2 | 1 | 97 | 0 | 0.39 | 0 | 1.4 |
| 3 | 3 | 3 | 1 | 96 | 0 | 0.43 | 0 | 21.0 |
| 4 | 1 | 1 | 2 | 97 | 0.74 | 0.68 | 31.0 | 25.5 |
| 5 | 2 | 2 | 2 | 96 | 1.32 | 0.75 | 34.0 | 41.0 |
| 6 | 3 | 3 | 2 | 95 | 0 | 0.9 | 0 | +50 |
| 7 | 1 | 1 | 3 | 96 | 0.87 | 0.62 | +50 | 48.0 |
| 8 | 2 | 2 | 3 | 95 | 1.39 | 1.72 | +50 | +50 |
| 9 | 3 | 3 | 3 | 94 | 1.91 | 1.92 | +50 | +50 |

[1] 1:1 iron oxide and starch.  [2] 1:1:1 iron oxide, starch, and sodium chloride.

It can be seen from Table C of the foregoing example that use of a metal halide makes 1% moisture far more satisfactory for making a mold. As a practical matter, without the metal halide, more water, preferably about 2% or more, should be used.

When a halide is used in the molding composition of this invention, any alkali metal halides or alkaline earth metal halides are utilizable. For example, potassium chloride, sodium bromide, calcium chloride, and magnesium chloride may be used. As has been shown, ammonium halide may be used.

The ligno sulfonates usable in the present invention comprise a wide range of readily available materials. In general they are by-proucts of the paper and pulp industry. Typically they are anionic wetting agents and have binding power, i.e., they are gluelike in nature. Sodium and calcium ligno sulfonates are the most common.

In general, any ligno sulfonate selected from the class consisting of alkali metal ligno sulfonates, alkaline earth metal ligno sulfonates, and ammonium ligno sulfonate may be used in the present invention.

The term "starch" as employed herein is intended to be used in the broad sense of the word, since essentially any partially dextrinized or gelatinized starchlike material will function effectively with iron oxide to produce an effective binder.

Except in those instances where a molding sand is used that has a certain amount of natural bonding characteristics and good properties for green sand molding, some type of drying will normally be needed. Drying may be conducted in various manners, as by baking at over 250° F., preferably at about 300° F. or over, prior to use. Surface drying, as by torch or a heat radiating means, may be employed in certain instances.

It is seen that this invention provides a novel foundry binder which, when mixed with sand and water, provides an effective foundry molding composition.

It is further seen that on use of molds prepared from the molding composition of this invention, a superior molded article is produced which is substantially free of burn-on and/or ceroxide defects.

Molds made in accordance with this invention find their most frequent use as core molds; however, they are not limited solely to such application.

What is claimed is:
1. A foundry binder comprising a mixture of small particles of iron oxide and starch, said iron oxide and starch each being present in weight fractions, based on the weight of said mixture of particles of the same order of magnitude, said foundry binder further comprising a member selected from the group consisting of ammonium halides, alkali metal halides, and alkaline earth metal halides.

2. The foundry binder of claim 1 in which said member is ammonium chloride.

3. The foundry binder of claim 1 in which said member is sodium chloride.

4. A foundry binder comprising a mixture of small particles of iron oxide and a compound selected from the group consisting of alkali metal ligno sulfonates, alkaline earth metal ligno sulfonates, and ammonium ligno sulfonate, said iron oxide and said compound each being present in weight fractions, based on the weight of said mixture of particles, of the same order of magnitude, said foundry binder further comprising a member selected from the group consisting of ammonium halides, alkali metal halides and alkaline earth metal halides.

5. The foundry binder of claim 4 in which said compound is ammonium chloride.

6. The foundry binder of claim 4 in which said compound is sodium chloride.

7. A well-mixed molding composition comprising a major proportion of sand, an effective minor proportion of water, said effective minor proportion being no less than about 1% water and no greater than about 5% water, based on the weight of said composition and an effective minor proportion of a foundry binder, said foundry binder comprising a mixture of small particles of iron oxide and starch in intimate contact, in which said iron oxide and said starch are each present in substantially equal proportions based on weight, and in which said iron oxide is present in an effective quantity, no less than about 1½%, based on total weight of the composition, said sand being present in quantity of at least about 90% by weight and said foundry binder being present in quantity of between about 2½% by weight and about 9% by weight, said molding composition further comprising a minor proportion of a member selected from the group consisting of ammonium halides, alkali metal halides, and alkaline earth metal halides.

8. A well mixed molding composition comprising a major proportion of sand, an effective minor proportion of water, said effective minor proportion of water being no less than about 1% water and no greater than about 5% water, based on the weight of said composition, and an effective minor proportion of a foundry binder, said foundry binder comprising a mixture of small particles of iron oxide and a compound selected from the group consisting of alkali metal ligno sulfonates, alkaline earth metal ligno sulfonates, and ammonium ligno sulfonates, said iron oxide and said compound each being present in substantially equal weight proportions and said iron oxide being present in an effective quantity, no less than about 1½%, based on the total weight of composition, said sand being present in quantity of at least about 90% by weight and said foundry binder being present in quantity of between about 2½% by weight and about 9% by weight, said molding composition further comprising a minor proportion of a member selected from the group consisting of ammonium halides, alkali metal halides, and alkaline earth metal halides.

References Cited

UNITED STATES PATENTS

| | | | |
|---|---|---|---|
| 2,405,650 | 8/1946 | Hartwig et al. | 106—38.6 |
| 2,875,073 | 2/1959 | Gogek | 22—194 |
| 3,116,522 | 1/1964 | Taylor et al. | 22—216.5 |
| 3,158,912 | 12/1964 | Schweikert | 22—196 |

FOREIGN PATENTS

| | | |
|---|---|---|
| 801,579 | 9/1958 | Great Britain. |
| 868,003 | 10/1961 | Great Britain. |

OTHER REFERENCES

The Iron Age, vol. 169, No. 26, June 26, 1952.

WILLIAM J. STEPHENSON, *Primary Examiner.*

MARCUS U. LYONS, *Examiner.*

E. MAR, *Assistant Examiner.*